US008318655B1

(12) United States Patent
Drost et al.

(10) Patent No.: US 8,318,655 B1
(45) Date of Patent: Nov. 27, 2012

(54) METHOD OF MANUFACTURING MOLDED SOLID INDUSTRIAL CLEANING BLOCK

(76) Inventors: Brad Drost, Woodstock, GA (US); Walter Drost, Jr., Cummimg, GA (US); Bryan Drost, Blairsville, GA (US)

(*) Notice: Subject to any disclaimer, the term of this patent is extended or adjusted under 35 U.S.C. 154(b) by 0 days.

(21) Appl. No.: 13/215,517

(22) Filed: Aug. 23, 2011

Related U.S. Application Data

(63) Continuation of application No. 13/175,852, filed on Jul. 2, 2011.

(51) Int. Cl.
*C11D 11/00* (2006.01)
*B29C 39/00* (2006.01)

(52) U.S. Cl. ........ 510/445; 510/108; 510/224; 510/447; 264/212; 264/219

(58) Field of Classification Search .................. 510/441, 510/439, 445, 447, 108, 224; 264/132, 212, 264/213, 219
See application file for complete search history.

(56) References Cited

U.S. PATENT DOCUMENTS 5,534,178 A * 7/1996 Bailly et al. .................. 510/367
5,666,785 A * 9/1997 Jouffreau et al. ............... 53/411
5,759,988 A * 6/1998 Heile et al. .................... 510/441
D406,635 S 3/1999 Russell
D419,262 S 1/2000 Klaers
6,156,715 A 12/2000 Lentsch
6,238,612 B1 * 5/2001 Allan et al. ................... 264/325
7,544,409 B2 6/2009 Copland
2002/0006890 A1 * 1/2002 Sunder et al. ................. 510/446
2006/0257596 A1 * 11/2006 Catalfamo et al. ........... 428/34.1
2008/0242572 A1 10/2008 Icht
2008/0274932 A1 * 11/2008 Smith et al. ................... 510/225
2009/0123679 A1 * 5/2009 Denome et al. .............. 428/35.2

FOREIGN PATENT DOCUMENTS

DE 19955240 A1 * 5/2001
WO WO 2010/104846 A2 * 9/2010

* cited by examiner

*Primary Examiner* — Lorna M Douyon

(57) ABSTRACT

A method of manufacturing a detergent composition comprising combining a plurality of components suitable for producing a detergent block which is water soluble into a fluid mixture. A mold assembly is provided which has a first mold component and a second mold component. The first and second mold components define a mold assembly having a body and a bottom. The body includes an outer wall, a bottom and outer wall which defines a mold interior. The fluid mixture is presented into the mold assembly and allowed to harden into at least a partially solid state within the mold defining a solid soluble, consumable detergent block. Once the block is at least partially cured, the first and second mold components are separated exposing the solid soluble, consumable detergent block to the ambient environment. Water soluble indicia are positioned onto the soluble consumable detergent block.

2 Claims, 13 Drawing Sheets

METHOD OF MANUFACTURING MOLDED SOLID INDUSTRIAL CLEANING BLOCK

CROSS-REFERENCE TO RELATED APPLICATION

This U.S. non-provisional application is a continuation of and claims priority to U.S. patent application Ser. No. 13/175, 852 filed on Jul. 2, 2011.

FIELD OF THE INVENTION

The present invention relates to a solid industrial and institutional cleaning block, and in particular to a molded solid cleaning block and process of manufacturing therein wherein the solid cleaning block is 100% consumable and is viable for industry utilization absent extraneous packaging.

BACKGROUND OF THE INVENTION

Industrial and institutional cleaning involves various cleaning activities including washing of dishware such as plates, cups, and utensils and the like in a continuous process at such institutions and industries like restaurants, hotels, long-term care facilities, schools and military as well as cleaning at car washes and the like and other various cleaning activities requiring the utilization of consumable cleaning products. The various cleaning processes are repeated several times each day in order to facilitate serving the large volume of individuals or customers at these facilities. Dedicated washing systems utilize associated detergents, and related products such as rinse additives, flatware presoaks, pot-pan presoaks and the like in combination with controlled dispensing systems specifically designed to handle the large bulk of volume of detergents. One of the primary characteristics of the cleaning industry is that the related products are consumable requiring the constant furnishing of replacement products. It is estimated that approximately fifty million units of molded solid detergents and extruded film wrapped detergents are consumed annually. A drawback to this industry is the production of waste materials which are associated with the packaging and delivery of the respective detergents and related products from the manufacturer to the consumer. In particular, the presence of such waste generated from such products is estimated to be approximately ten thousand tons a year.

The accumulation of waste is particularly a problem when at sea because of the limited availability of resources for discharging the waste products. In order to alleviate the stress put onto the marine world and particularly on ships, the U.S Navy has initiated a PRIME program which focuses on Plastics Removal in the Marine Environment to reduce the amount of plastic and solid waste brought on board Navy vessels. Accordingly, there is attention placed on the desirability of reducing waste when possible and in particular with the Navy.

The methods of manufacturing and dispensing of detergents for industrial and institutional utilization has evolved significantly over the last number of years. A brief description of these detergent products and their packaging is provided. All described methods are of methods of controlled dispensing, i.e. not pouring.

Liquids

Liquid detergents are normally dispensed through the use of peristaltic pumping systems. The concepts are well understood. Pumps normally operate off of a concentration indication signal (conductivity, pH, etc.), or on a timed basis (run pump for x seconds, every cleaning cycle). Liquid product forms are ubiquitous in the industry. They are easy to formulate, with minimal equipment costs. Depending on the type of product, the formula may contain from 50-99% water. Some examples of liquid product dispensing equipment are provided by Knight Equipment—Lake Forest, Calif.; Beta Technology—Santa Cruz, Calif.; and Viking Injector-Nesquehoning, Pa. Being a liquid, these detergents are packaged in containers which are disposed of after the liquid is consumed.

Powders

Powdered detergents are normally dispensed by producing and packaging the detergent into a plastic bottle. The shape and size of the jar may be considered to be approximately the size of a 1 gallon mayonnaise jar. Over the mouth of the jar, a cap is attached which contains a screen. This jar and screen combination is placed inverted into a dispenser device which has a water spray mechanism. When flow of water is initiated, the spray wets the screen, and dissolves the powder through the screen. The solution of water and detergent then flows typically by gravity to the use point. The flow of water can be from a controller which is monitoring some parameter (conductivity, pH, etc), or on a time basis. Normally, a signal is provided to a water valve which opens, and allows water to flow to the dispenser bowl, through the spray tip, and onto the screen. Powdered detergents dispensed in this manner are at times referred to "encapsulated". Powdered products can also be dispensed by pouring an amount of powder into a dispenser bowl that has a lid to create a closed chamber. The poured powder rests upon a screen, which remains in the dispenser bowl that allows for the spray of water to dissolve the powder. An example of a dispenser bowl of this type is provided by Beta Technology. Like liquids, the packaging jar is disposed of once the powder is consumed.

Solids

In some arenas, due to the issues that may arise with powders, solid detergents and related products have been established. Typically, solid detergents are sometimes referred to as "blocks" in an attempt to differentiate between a powder. Prior art disclosures of solid blocks and associated dispensers are provided in U.S. Pat. Nos. 4,426,362; 4,569,780; 4,826, 661 and Re. 32, 818 all assigned to EcoLab of St. Paul, Minn. These solids are produced either through hydration or a melting process. In hydration slurry is produced of hydratable materials in water. The slurry is poured into a bottle. The contents are allowed to hydrate, which reduces the free water content keeping the slurry fluid. As the free water is bound via hydration, the slurry solidifies. In the melting process, a slurry is produced of materials, some of which are above their melting point at the processing temperature. The slurry is poured into a bottle. The slurry cools. The liquid materials above their melting point solidify as the temperature falls. The slurry eventually solidifies. As shown in the patents referenced above, the solids are cast directly into a sturdy solid plastic container which acts as a mold, a shipping and storage container, and ultimately a dispenser housing which is adapted to affix with a related dispenser as shown in U.S. Pat. No. 4,826, 661.

As shown in U.S. Pat. No. 4,826,661, dispensing equipment for solid detergents is similar to encapsulated powder products. There is no screen attached to the jar, however, since the product should not pour out of the jar unlike a powdered detergent. The solidified solid in a jar is inverted, and placed into a dispenser bowl. A spray of water contacts the face of the solid, through the opening in the mouth of the jar. The detergent solution exits, and travels by gravity to the use point. Whereas in an encapsulated product, the powder is always in contact with the screen of the cap, and is therefore always in the same vertical position; in a solid, the face of the detergent is eroded away during use. As a result, the "face" of the solid moves vertically away from the spray jet, as the product is consumed. When the solid is fully consumed, the outer dispenser housing is discarded.

Revised Solids

U.S. Pat. Nos. 6,831,054 and 6,583,903 both assigned to Ecolab, disclose an alternative embodiment of a detergent solid. These patents disclose that a dimensionally stable solid block for ware washing may be formed via extruded pellet, or extruded block. In forming the solid cleaning block, ingredients are mixed and discharged from a mixing system through a die or other shaping means. The profiled extrudate then can be divided into varying sizes. The extruded solid may be cast directly or extruded directly into a container or other packaging system without structurally damaging the material. The preferred packaging used to contain the compositions is manufactured from a flexible, easy opening film material. Based on the examples provided in the specification of the patents, it appears that that the packaging material is necessary because the solid is only fractionally hydrated as evidenced by the low levels of water disclosed in the examples. The packaging assists in preventing the absorption of moisture from the atmosphere during shipping and handling prior to being positioned in a dispenser. Furthermore, the packaging provides a surface for the labeling of the product.

This solid is disclosed as being dispensed by those dispensers previously identified in U.S. Pat. No. 4,826,661 previously mentioned. Furthermore, a detergent dispenser as disclosed in U.S. Pat. No. 6,773,668 also assigned to Ecolab discloses another dispenser suitable for the utilization of the extruded blocks as disclosed in U.S. Pat. Nos. 6,831,054 and 6,583,903. As noted in U.S. Pat. No. 6,773,668, the solid block detergent which is a cast solid block is revealed by removing associated packaging.

Additionally, the dispenser disclosed in U.S. Pat. No. 6,773,668 utilizes a deep reservoir for receiving the solid detergents. This patent discloses that two thin solid blocks may be stacked upon one another inside the cavity to retain a relatively constant supply of detergent within the dispenser. The solid block has a dimension of approximately 2.13 by 4.00 by 6.36 inches. Additionally, this patent discloses that in the preferred embodiment, the preferred shape of the solid detergent is a pellet in view of the increase surface area of the pellets in comparison to a solid block detergent. While the solid pellets are easy to handle, larger solids as disclosed in U.S. Pat. Nos. 4,426,362; 4,569,780 and 4,826,661 are larger and heavier and placement within the dispenser is difficult due to their weight and the lifting required positioning the detergent within the reservoir.

Additional problems arise from utilizing such solid detergents which are housed in containers due to the expanding gap from the solid detergent product and the spraying dispenser head which arises as the detergent product is consumed. For instance, rinse additives are utilized for dishwashing in order to facilitate effective sheeting of residual water and quick drying. Liquid rinse additives are normally injected into the final rinse line of a dishwasher. The injection rate is coordinated in order to inject during the entire rinse cycle. A typical rinse cycle can have a duration of 2 seconds up to 30 seconds, depending upon the type of washing equipment. A variable speed pump of some type is normally used to perform the injection. Whereas the dishwashing detergents can be quickly added in order to maintain a concentration based upon a signal from a controller, rinse additives are added much more slowly, and at very low levels into the rinse water. A typical target concentration of rinse additive actives into a rinse line is 30-50 ppm. By way of comparison, a typical dishwashing detergent will be used at a concentration of 500-2000 ppm.

Currently, solid rinse additives are typically packaged into capsules of a similar shape to the detergents. The solid rinse additives are placed into one of the aforementioned dispenser systems. A spray of water impacts the face of the solid, dissolving a portion. This solution created then travels by gravity to a small container or reservoir. The flow of water to the solid rinse aid is normally stopped when the volume in this reservoir is at some set point level. Typically a float switch will interrupt the flow of water to the solid block to keep from overfilling the reservoir.

This reservoir of rinse additive solution is then plumbed to an appropriate pump means that will draw a portion of the solution from the reservoir, and inject the solution into the final rinse water. When the level of the reservoir becomes depleted due to being consumed for the rinse process, the float switch will then allow for more water spray against the solid rinse product to occur, thus refilling the reservoir for later use.

An inherent difficulty in dispensing of solid products that are retained within a jar or capsule is that as the product is eroded by the spray of solvent, the face of the product moves away from the spray tip. As this distance increases, the impingement force of the water or solvent against the face of the block decreases, and less detergent material is dissolved per unit volume of water. The effect of this is that what has traditionally been seen in the industry is that the concentration of detergent is high in the spray solution exiting a dispenser bowl when the jar is newly installed. But, as the jar is consumed, the concentration of the spray solution decreases significantly.

For products that are controlled by some type of measurement setpoint, as may be the case with a dishwashing detergent, this is overcome by the controller allowing for a longer period of spray time against a solid block. The concentration in the wash tank of the dishwasher is the controlled variable, not the concentration of the product as it exits the dispenser bowl.

For items such as rinse additives, manual pot and pan detergents, presoaks and sanitizers, there typically is no means to measure and control the concentration. If the solution exiting the dispenser bowl is not consistent, the final concentration at the use point will not be consistent. This can created numerous issues such as over or underuse of products, poor results, or possibly food safety issues which could harm the patrons of a facility eating their meals on wares which are supposed to be free of pathogenic bacteria.

A prime example is the use of solid rinse additives. If the concentration of actives in the reservoir varies as a result of the changing distance of the solid block from the spray tip, when the rinse pump injects the solution from the reservoir, the final concentration of actives in the rinse water will vary as well. This can lead to the previously mentioned issues, since this volume of water is the last amount that contacts wares and utensils While each of these prior detergents and other ware washing products are suitable for their intended purpose they all result in a waste product being thrown away and in most cases difficulties in applying the product due to the offset which arises from the dissolving of the respective product. From the containers which the solid detergents were molded and packaged in to the plastic wrappings which encase extruded detergents, trash results. Consequently, due to the large volume of ware washing cycles incurred by these industrial institutions, the associated waste product from these detergent supplies is environmentally detrimental.

Accordingly in order to alleviate the environmental stress that the waste from the solid detergents produces, there is a need for a solid detergent which is 100% consumable in a dispenser for industrial cleaning.

Also, there is a need to facilitate the easy placement of a solid detergent which is 100% consumable in a dispenser for industrial cleaning.

Furthermore, there is a need to provide for the placement of information on a solid detergent in a manner which still facilitates the 100% consumption of the solid detergent while still providing information to a consumer which is necessary for the proper handling and utilization of the product.

These objectives are accomplished in some manner by the preferred embodiment disclosed herein.

SUMMARY OF THE INVENTION

The above objectives are accomplished according to the invention by providing a method of manufacturing a detergent composition comprising combining a plurality of components suitable for producing a detergent block which is water soluble into a fluid mixture. The components are of sufficient quantity to produce a soluble consumable detergent block weighing at least three pounds. A mold assembly is provided which has a first mold component and a second mold component. The first and second mold components define a mold assembly having a body and a bottom. The body includes an outer wall, a bottom and outer wall which defines a mold interior. The outer wall defines an opening which communicates with the mold's interior. The fluid mixture is presented into the mold assembly and allowed to harden into at least a partially solid state within the mold defining a solid soluble, consumable detergent block. Once the block is at least partially cured, the first and second mold components are separated exposing the solid soluble, consumable detergent block to the ambient environment. Additionally, water soluble indicia are positioned onto the soluble consumable detergent block.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DESCRIPTION OF THE PREFERRED EMBODIMENT

The preferred embodiment relates to the manufacturing and production of a cleaning product for industrial and institutional environments. Such cleaning products may include detergents, and related products such as rinse additives, flatware presoaks, pot-pan presoaks and the like utilized in the cleaning process. For the purposes of this disclosure such products will be commonly referred to as a "detergent" which to one skilled in the art encompasses such products.

Manufacturing Process

Figure 1:
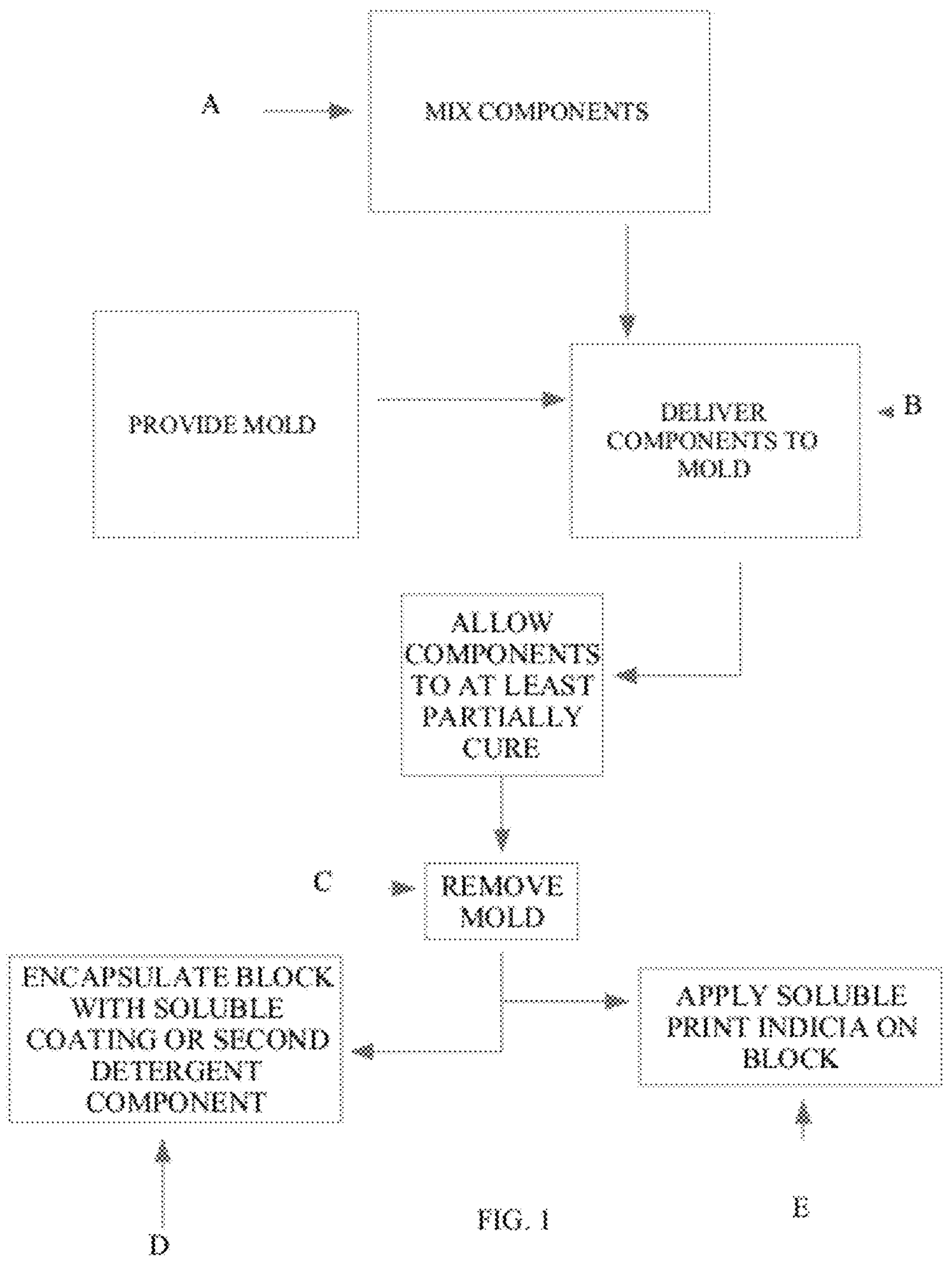
FIG. 1 is a general flow chart illustrating the process of manufacturing a molded solid cleaning block according to the present invention.
Figure 2:
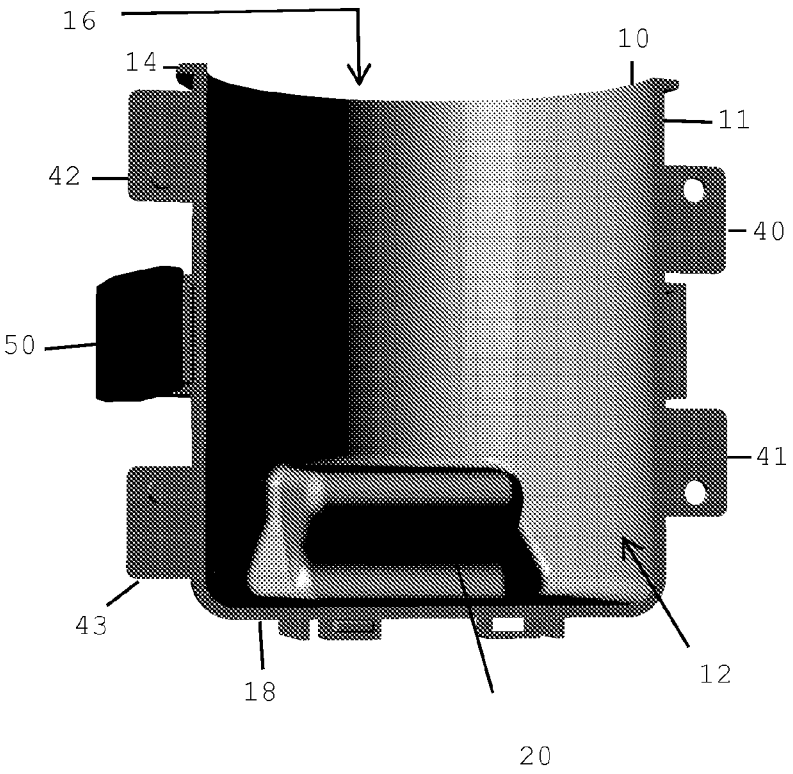
FIG. 2 is an illustration of a first mold member for forming a molded solid block detergent according to the present invention.

As shown in FIG. 1, a dimensionally stable solid consumable soluble detergent is preferably produced by either mixing meltable components in a liquid state or by such components in a slurry for forming a hydrated block at Step A, and once mixed, delivering the fluid into a removable mold at Step B, and allowing the fluid to at least partially cure within the mold. A partially cured structure is one which would be sufficiently stable not to collapse once the mold is removed. Once the fluid is at least partially cured forming the dimensionally stable solid soluble block, the mold is removed at Step C. Once the solid soluble block is removed from the mold, the block may encounter additional steps such as being encapsulated at least partially with a soluble outer coating or second detergent component at Step D or imprinted with soluble indicia at Step E.

Examples of various products manufactured according to the invention are as follows:

Class 1 - Mild Alkaline, low foam, hydrated block detergent

| Component | % Range |
|---|---|
| Tap Water | 20-40 |
| Liquid Sodium Silicate (3.2:1, SiO2:Na20 ratio) | 15-30 |
| Low Foam Nonionic Surfactant | 1-3 |
| Dye, fragrance, additional minor additives | 0-5 |
| Sodium Carbonate | 10-30 |
| Sodium Tripolyphosphate | 20-40 |

Process Steps

1. In a jacketed mixer with temperature control capability, add the water, liquid sodium silicate and nonionic surfactant. Begin agitation.
2. Bring mixer contents to approximately 120 F.
3. Add the dye, fragrance and any other additional minor additives.
4. Slowly add the sodium carbonate, ensuring that lumps of powder do not form. Temperature of mix will increase to approximately 140 F with addition of sodium carbonate.
5. Bring mix temperature to 140 F if not already there by using the cooling or heating functions of the jacketed mixer.

6. Add the sodium tripolyphosphate slowly, ensuring that lumps of powder do not form. Mix until homogeneous, maintaining temperature around 140 F.
7. Perform QC tests.
8. Dispense product for molding.

| Class 2 - Rinse Additive Block Comprising Meltable Components, Non-Aqueous | |
|---|---|
| Component | % Range |
| Polyethylene Glycol 8000 Molecular Weight | 20-50 |
| Low foam, nonionic rinse aid surfactant liquid | 30-60 |
| Solid nonionic surfactant, melting point >120° F. | 20-40 |
| Dye, fragrance, additional minor additives | 0-2 |

Process Steps

1. In a jacketed mixer with temperature control capability, add the polyethylene glycol and low foam nonionic liquid surfactant.
2. Bring temperature of contents to approximately 150 F.
3. Begin agitation.
4. Add the solid nonionic surfactant to the mix, ensuring it melts completely.
5. Add any dye, fragrance or other minor ingredients.
6. Bring mix to packaging temperature of approximately 140 F.
7. Perform QC tests.
8. Dispense product for molding.

| Class 3 - Manual Pot and Pan Detergent Comprising Meltable Components, Non-Aqueous | |
|---|---|
| Component | % Range |
| Coconut Diethanolamide Surfactant | 20-40 |
| Nonylphenol Ethoxylate, 9.5 mol EO Surfactant | 20-40 |
| Polyethylene Glycol 8000 Molecular Weight | 10-35 |
| Sodium Alpha Olefin Sulfonate Powder | 15-30 |
| Dye, Fragrance, additional minor additives | 1-5 |

Process Steps

1. In a jacketed mixer with temperature control capability, add the coconut diethanolamide and nonylphenol ethoxylate.
2. Begin agitation.
3. Heat contents to approximately 170 F.
4. Add polyethylene glycol.
5. Bring mix temperature to approximately 180 F.
6. Add sodium alpha olefin sulfonate slowly, to ensure no lumps are created.
7. Maintain temperature in the vicinity of 180 F.
8. Add dye, fragrance and any other minor ingredients.
9. Perform QC tests.
10. Dispense product for molding.

In the preferred embodiment, the solid detergent block which is 100% consumable and soluble is molded utilizing a preferred two piece mold as shown in FIGS. 2-7. As shown in FIGS. 2-7, a first mold member F includes a single body member 10. Single body member 10 has an outer wall 11 defining an perimeter which defines a generally half cylindrical interior 12. Single body member 10 includes an upper rim 14 defining an interior opening 16 which communicates with interior 12. Single body member 10 further includes a bottom 18 disposed opposite of interior opening 16. A portion of the outer wall 11 is indented into the interior 12 of the first mold member F near bottom 18 to form indent 20.

In particular, in the preferred embodiment, the diameter across the interior 12 is approximately five point sixty-five inches and indent 20 extends inwards toward the center of the interior approximately two inches or approximately thirty-three percent. Furthermore, the indent is preferably comprised of an upper section 30 and lower section 32 which are integral with an intermediary transitional section 33. In the preferred embodiment, the indent forms a general "S" configuration from the apex of the upper section 30 to the lower extension of lower section 32. The particular curves of the "S" preferably have an upper radius of point thirty five inches from the transition of the upper section to the intermediary transitional section 33 and a similar point thirty-five inches from the transition of the intermediary transitional section 33 to the lower section 32. In the preferred embodiment, the indented portion forms a recess within the respective molded solid sufficient for receiving the fingers of a person thereby forming a handle. In the preferred embodiment, the apex of the upper section is generally co-planar with bottom 18 of single body member 10 which will result in the formed solid having a handle which enables a person's fingers to fit into recesses formed by the indent and having the upper curved portion of the "S" cradle in the palm of the user just below the fatty portion of a person's thumb.

In addition to having an interior for forming a solid molded structure, first mold member F includes a plurality of tabs for matingly engagement with a second mold member G which has an identical interior and indenture. In the preferred embodiment, four tabs 40, 41, 42 and 43, with two tabs located on each side of the outer wall 11, 40 and 41 on one side, and 42 and 43 on another with each side having an upper tab 40 and 42 and a lower tab 41 and 43. The various tabs include either a boss or a boss receptacle for matting engagement with second mold member G. In the preferred embodiment, second mold member G is generally symmetrical with first mold member F except for the positioning of tabs 44, 45, 46, and 47 and the mating attachment device of either a boss or boss receptacle for receiving a respective counterpart. Each tab, 44, 45, 46 and 47 is positioned to mate with a respective partner of tabs 40, 41, 42 and 43 for securing each mold member together in a manner wherein the respective interiors of the mold members form a continuous seamless circle.

Figure 3:
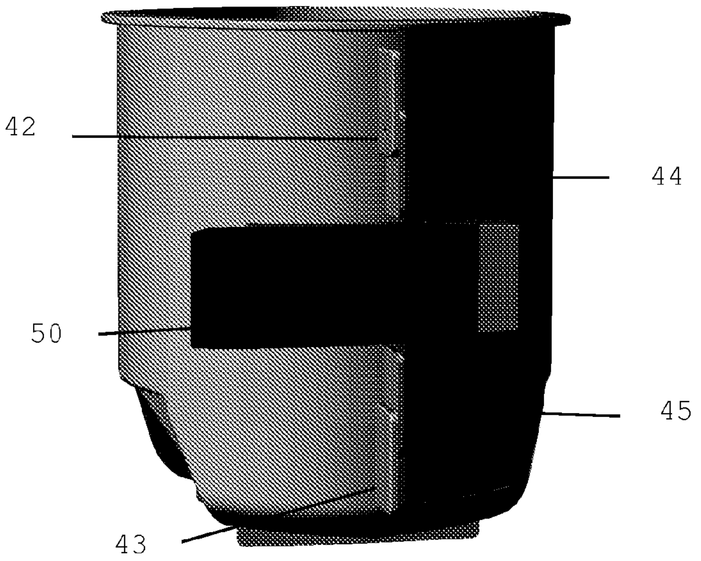
FIG. 3 is a side view of a mold assembly comprising of a first and second mold member for forming a molded solid block detergent according to the present invention.

As shown in FIG. 3, the respective upper tabs 42 and 44 of first and second mold member are vertically offset as are respective lower tabs 43 and 45. This construction enables an operator to open the mold and separate the first and second mold members by using a thumb and index finger simultaneously applying a forward and backward force to the respective tabs thereby detaching a respective boss from a respective boss receptacle. Also, shown in FIGS. 2 and 3, a compressive latch 50 is carried by first mold member F. Compressive latch 50 engages a corresponding latching member carried by second mold member G and when latched generates a compressive force. FIG. 3 shows first and second mold members F and G latched together with the respective bosses of mating tabs engaged.

Figure 4:
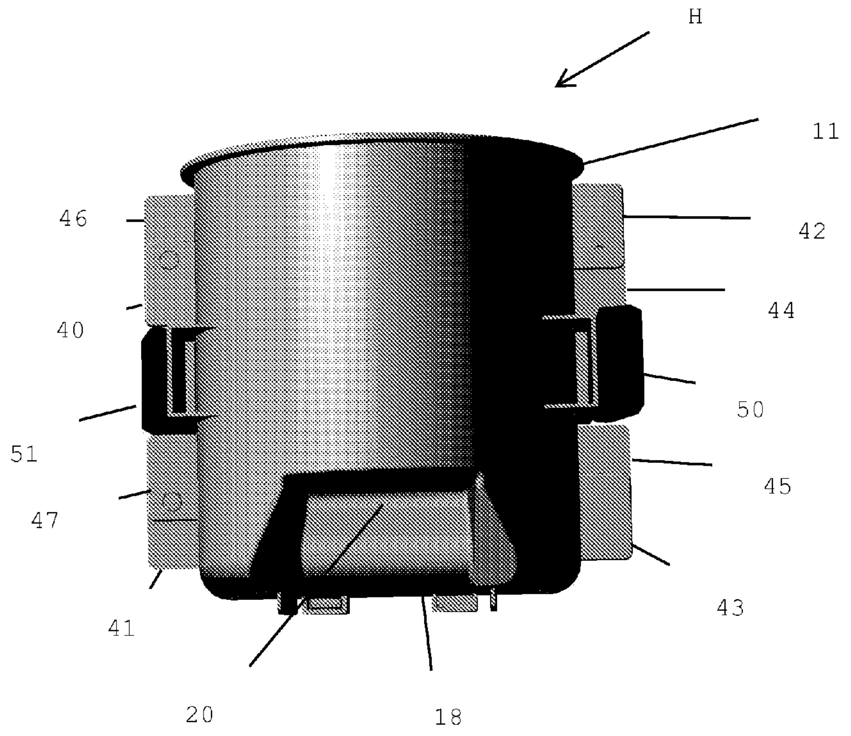
FIG. 4 is a front view of a mold assembly comprising of a first and second mold member for forming a molded solid block detergent according to the present invention.

FIG. 4 presents a front view of the fully constructed mold H with the respective tabs, 40-47 matingly engaged and compressive latches 50 and 51 are engaged. Indent 20 is illustrated extending from bottom 18 into the interior of the assembled mold.

Figure 5:
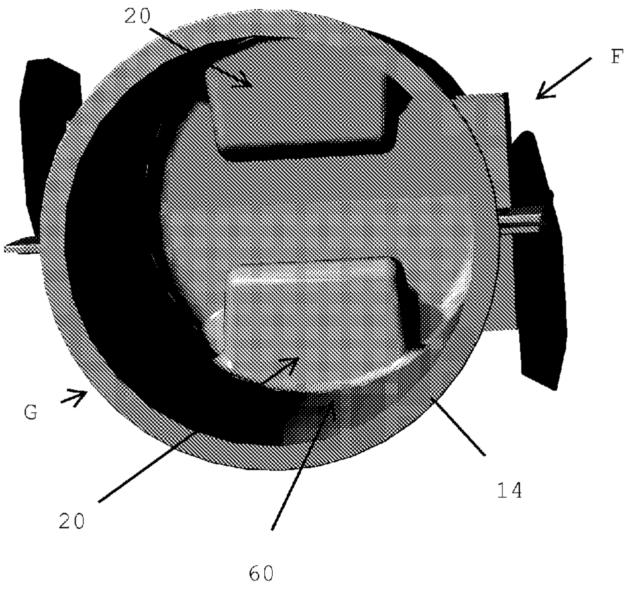
FIG. 5 is a top view of a mold assembly comprising of a first and second mold member for forming a molded solid block detergent according to the present invention.

FIG. 5 illustrates the assembled mold with first mold member F latched with second mold member G. Preferably the assembled mold forms a cylinder having an upper opening 60 formed by upper rim 14 for receiving the components comprising the desired detergent. The fluid components may be derived either from mixing a slurry via hydration or from a mixture of melted components. The fluid is dispensed into the assembled mold via the upper opening 60. Indents 20 extend into the interior of the assembled mold approximately two inches on each side. Indents 20 form a lip which for handling by a person. In the preferred embodiment, the indents extend approximately a third of the diameter providing clearance for a person to extend their fingers into the intent recess approximately two thirds of the width of the molded product.

Figure 6:
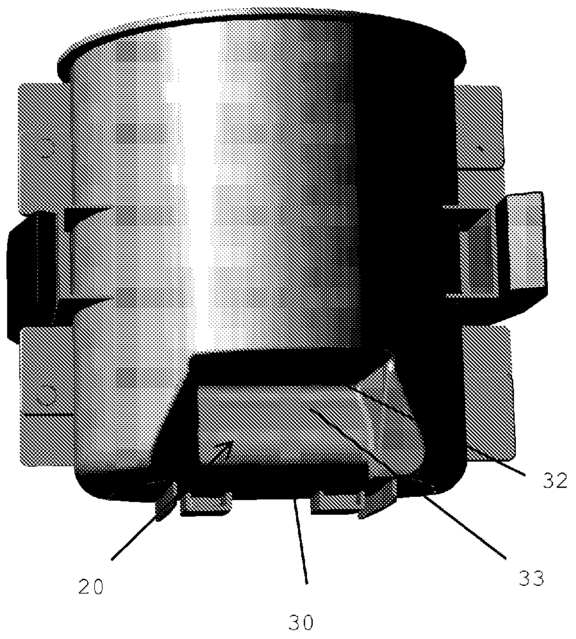
FIG. 6 is a perspective view of a mold assembly comprising of a first and second mold member for forming a molded solid block detergent according to the present invention.

FIG. 6 illustrates the assembled mold assembly from an angled side perspective illustrating he recess formed by the mold which ultimately forms a handle on the molded product. The profile of the indented indent forms a "S" having upper section 30, transitional section 33 and lower section 32. In the preferred embodiment, the transitional curve profile has a radius of 0.350 inches.

Molded Product

Figure 7:
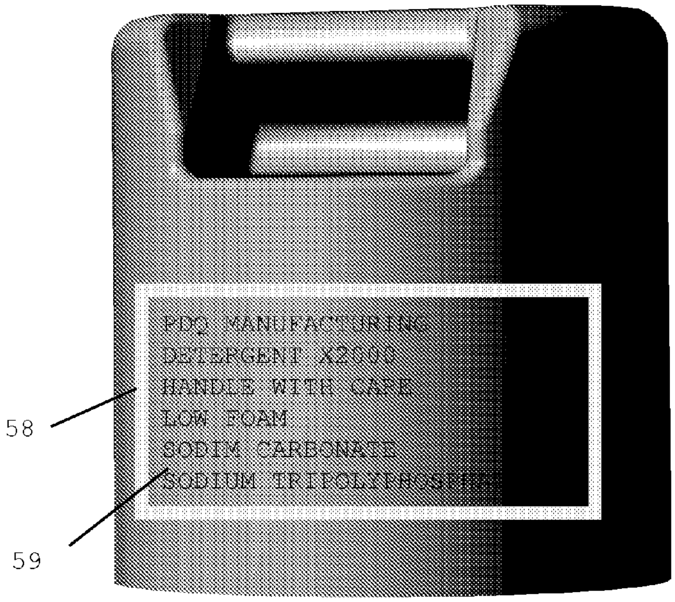
FIG. 7 is a side perspective view of a dimensionally stable solid block detergent according to the present invention.
Figure 8:
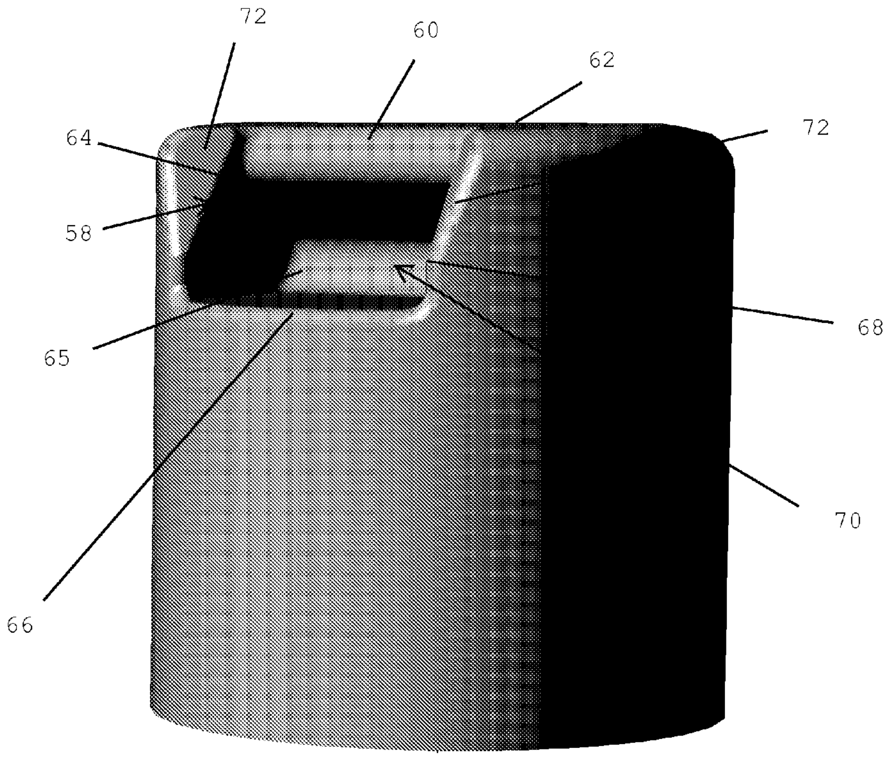
FIGS. 8 and 8A are partially rotated side views of a dimensionally stable solid block detergent according to the present invention highlighting the contour of the handle.

FIGS. 7-11 illustrate the molded consumable soluble detergent product of the preferred embodiment. FIGS. 7 and 8 illustrate the molded product in its preferred position for placement within a dispensing unit known in the art for dispensing cleaning product such customarily used for ware washing and the like. The molded product is preferably approximately six inches in height with a diameter of approximately five point sixty five inches. Such a configuration produces a product which weighs from three to ten pounds. While this is the preferred size, the molded product may range from two to twenty inches in height and weigh up to ten pounds.

Figure 8A:
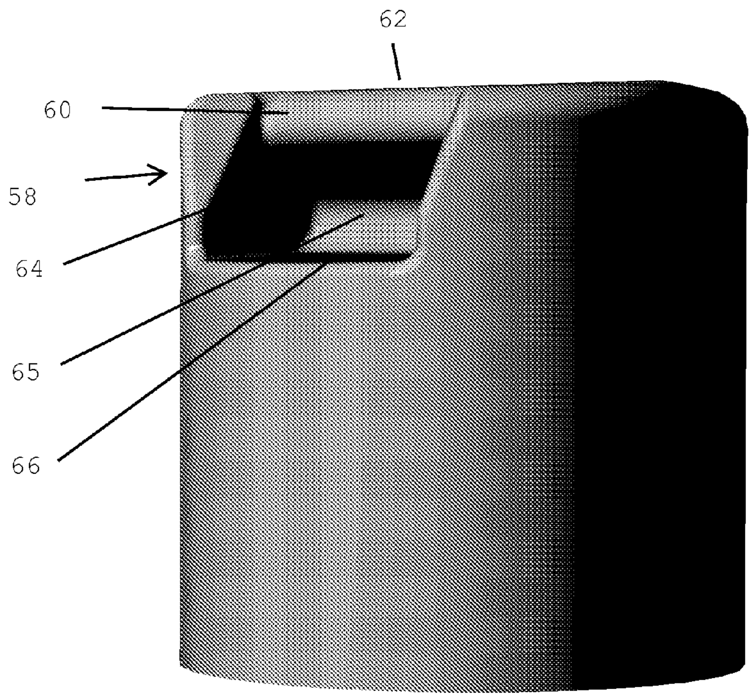
Figure 9:
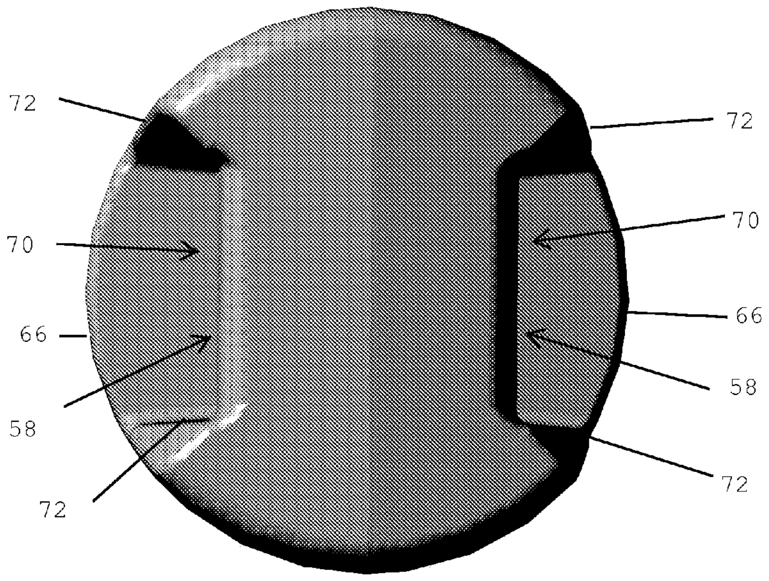
FIG. 9 is a top view of a dimensionally stable solid block detergent according to the present invention.

As shown in FIG. 7, a water soluble substrate 90 carries water soluble printed indicia 92. Water soluble printed indicia 92 may include product description information, safety information, or composition information. At the top of the molded product, a handle exists formed by the indentures of the assembled mold. As seen in FIGS. 8 and 8A, the handle 58 has a top portion 60 which is generally terminates flush with the top of the molded product 62. The top portion 60 extends laterally to a curved upper transition portion 64 which slopes downward into a lower transition portion 65 and terminates at a lateral handle ridge 66. The top portion 60 extends laterally parallel and offset from lateral handle ridge 66 forming a recess for receiving a person's hand. In generally, a lip is formed by top portion 60 providing a gripping surface for a person to grab and hence handle the molded product. Preferably handle 58 has a "S" shaped curved profile enabling the handle curved upper transition portion 64 to be received within a person's palm while the fingers of the person can grab the handle approximately where the upper and lower transition portions meet at 68 which forms the termination of the gripping portion of handle 58. Preferably handle recess 70 defined by lateral handle ridge 66 which extends inward towards the center of the molded product and the transitional portions and top portion of handle 58 provides sufficient clearance for receiving a person's entire hand. Preferably the width of the handle terminates at handle sidewalls 72. As seen in FIGS. 7 and 9, sidewalls 72 preferably flare outward providing access to the lower portion of handle 58 while providing clearance for the width of a person's hand. Additional consumable, soluble product is available for consumption in the related dispenser by terminating the handle at sidewalls rather than continuing the handle across the entire top of the molded product.

Figure 10:
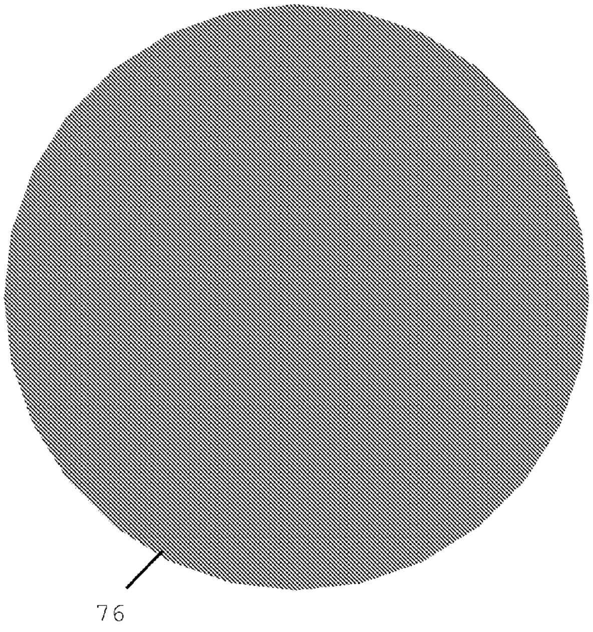
FIG. 10 is a bottom view of a dimensionally stable solid block detergent according to the present invention.
Figure 11:
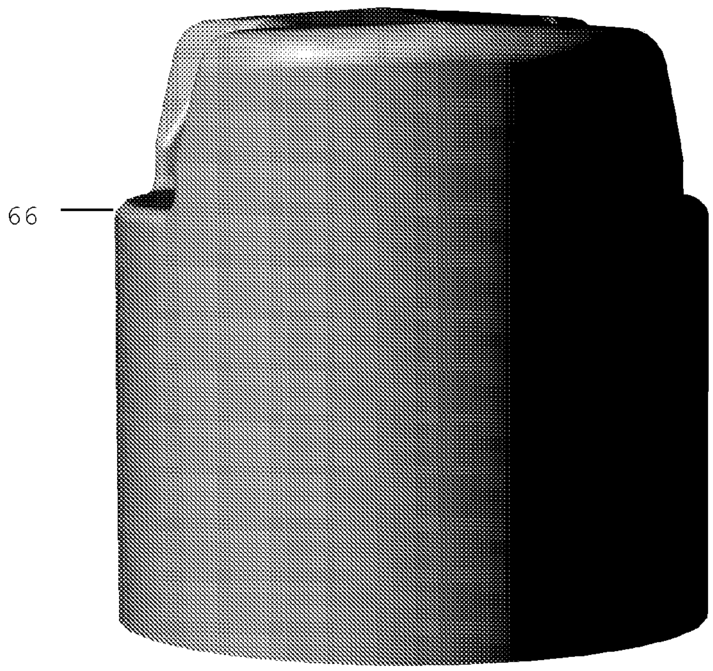
FIG. 11 is a side view of a dimensionally stable block detergent according to the present invention.

FIGS. 10 and 11 show different side perspectives of the molded product. FIG. 10 illustrates the preferred embodiment wherein the bottom 76 of the molded product is a continuous circle. Alternative shapes may be had, but the continuous circle provides for a larger surface area for dispensing more product into a cleaning system. FIG. 11 illustrates a side view of the molded product wherein the cross section of the molded product is uniform from the bottom until the area defined by the lateral hand ridge 66 wherein the handle is initially established. Preferably the consumable block has a diameter of three inches with an upper limit of nine inches and a height which ranges from two to twenty inches.

Molding Processing

Once the components are of the molded consumable soluble detergent are mixed, they are dispensed in a fluid state into the mold. The product is allowed to at least partially cure prior to the removal of the mold. The separation of the mold enables the indentions of the product to remain intact. If the product is not fully cured, the product is allowed to cool and complete the curing process. Once cooled, the product is available for shipping unwrapped for direct placement into an industrialized cleaning dispenser. The following are some steps which may occur:

Process Steps

1. After the product mixing steps are complete, and the batch is ready to package, the product from the mixing tank is connected to an appropriate filling system for viscous, fluid products. A typical filling system is constructed with positive displacement type pumps, such as gear, lobe, and air diaphragm or piston variety.
2. Assembled 2-part molds are placed onto a tabletop chain conveyor system. This conveyor system will move the empty molds to a position under the filling head of the filling system.
3. The movement of the mold will stop when in place for filling.
4. The mold is filled with a volume of product which coincides with how the product will be sold in the marketplace. The volume is normally correlated to equate to a mass of product. Solid detergents are normally sold on a mass basis, rather than a volumetric basis, due to the possibility of entrained air from the production process altering the final volume.
5. The filled mold is conveyed away from the filling system.
6. The mold is removed from the packaging line and placed into an area for initial curing. This area could be a cooling rack. This cooling rack could stay in an ambient air temperature environment, or it could be moved to a temperature controlled area. In addition, the product molds could be conveyed to a temperature controlled area to cure, without the use of a cooling rack. In addition, the product and molds could be placed into some type of temperature controlled bath, to allow for initial curing. In all product classes, this normally entails removing heat from the product in the molds. In Class 1 products, this will initiate a hydration reaction in which a portion of the free water used to keep the batch fluid is chemically bound to hydratable components of the formulation. In the Class 1 example, these hydratable components are the sodium carbonate and sodium tripolyphosphate. In Class 2 and 3 products, the removal of heat energy will initiate a freezing condition of some of the raw materials, as they drop below their native melting temperatures. No chemical reaction such as hydration occurs. Typical time for this initial curing in which the product will sustain its shape in the absence of the mold is from 1 hour to 8 hours.
7. After the initial curing condition has been met, meaning the block will sustain its shape in the absence of the mold, the blocks are removed from the molds. The removal of the molds can be automated or manually performed. Normally the removal of the molds will be manual. This will typically entail removal or release of the mold clamps, and separation of the 2 halves of the mold from the block.

8. After removal of the molds, the blocks can either be placed back into a temperature controlled environment to finish curing more completely, or they can be placed into the decorating phase of the process.
9. The removed molds can be inspected, cleaned if needed, and placed back into service on subsequent batches.

In one embodiment of the invention, the detergent has a hygroscopic property which prevents the detergent from absorbing twenty percent of its weight. Typically extruded detergents do not utilize a fully hydrated process hence rendering the resulting product susceptible to absorbing moisture from the environment. Such absorption tends to crack the product and also produce flaky caking. By processing the molded consumable soluble product via hydrated slurry or via melting components, the molded consumable soluble detergent product does not lend itself to absorbing a sufficient level of moisture from the environment which results in the caking or flaking of the product. Additionally the product is hygroscopic to a point that it will not crack when exposed directly to the ambient environment for a period longer than a week or 168 hours.

If the product is a detergent for washing wares, this product would typically be used in a modified version of the bulk powder dispenser described above from Beta Technologies with the W-5000 bowl. What is desired is a bowl unit that has a closable lid or cover. The reason is that normally, the plastic bottle contains the entire spray from the dispenser bowl. This provides a level of safety during dispensing from uncontrolled spray. With this concept, since there is no bottle, the spray needs to be contained in another manner. These bowls are somewhat readily available. A support structure within the bowl would be utilized for resting the product in position to receive a spray for dispensing.

With the block installed in the bowl, the lid is closed. By closing the lid on the Beta bowl, a safety switch is engaged, which will allow water flow to the spray tip, if detergent is demanded by a controller for the washing process. With the lid up, the switch is placed in a safe position, and no water flow to the spray tip can occur. This safety feature is common on dispenser bowls to allow for the safe changing of exhausted capsules of detergent.

With the block installed and the lid closed, a call for detergent will initiate spray through the spray tip. This spray will contact the downward facing side of the block. Some dissolution of the block will occur creating a concentrated detergent solution. This solution will exit the tapered bottom of the dispenser bowl. This solution will then travel through typically a piece of flexible tubing and will gravity drain into the washing equipment.

An experiment regarding the dissolving constancy illustrates that the concentration of the product was very consistent for the predominate utilization of the product. This consistency is established by providing the block at a general offset from the sprayer head which is accomplished due to the block being disassociated with an external container found in the prior art as prevalent in the prior art. By being independent of any external packaging, the product is able to be dissolved in a general consistent concentration. An example is shown below illustrating the generally consistent concentration of detergent being dispensed.

Product: Pilot batch of a non-caustic autodish detergent solid
Product Active Alkalinity 25%
Conditions: Continuous water flow, controlled to 120 F.
Flowrate set to 0.5 gpm
Empty Bottle Mass: 0 grams
Starting Product Mass 3621.2 grams

| Sample | Gross remaining | Net Remaining (g) | % Consumed | Sample Size (g) | Titrant (mL) | % Active Alkalinity | % Product |
|---|---|---|---|---|---|---|---|
| 3-1 | 3550.5 | 3550.5 | 1.952% | 99.716 | 15.90 | 0.4943 | 1.977 |
| 3-2 | 3271.0 | 3271.0 | 9.671% | 100.009 | 15.80 | 0.4898 | 1.959 |
| 3-3 | 2935.7 | 2935.7 | 18.930% | 100.458 | 16.10 | 0.4968 | 1.987 |
| 3-4 | 2128.1 | 2128.1 | 41.232% | 99.154 | 16.70 | 0.5221 | 2.088 |
| 3-5 | 1700.0 | 1700.0 | 53.054% | 102.024 | 17.20 | 0.5226 | 2.090 |
| 3-6 | 862.3 | 862.3 | 76.187% | 99.759 | 15.30 | 0.4754 | 1.902 |
| 3-7 | 192.2 | 192.2 | 94.692% | 100.621 | 9.50 | 0.2927 | 1.171 |

Labeling

With the exterior of the molded consumable soluble detergent product exposed to the environment, the printing of information may be done directly onto the product to convey certain information such as the sourced company, the ingredients, the type of product, i.e. detergent or rinse aid, directions for use, safety hazards and warnings. Labeling of products of this type is important for marketing purposes, but also for conveying of needed safe handling information to the end user. As shown in FIG. 7, labeling may be done either by printing the information directly onto the detergent, or printing onto a water soluble substrate which is applied to the block. Certain water soluble paper label stock is produced by Aquasol Corporation. Furthermore, printing inks which are water soluble are preferably utilized. Certain inks which are utilized for consumption by humans, such as being on a tablet or such, are water soluble and considered environmentally friendly. Certain inks provided by Colorcon of Chalfont, Pa. are such inks. Other inks may be provided which comprised of materials which will dissolve in water such as hydrogels, compressed sugars, compressed salts, polymers and oligomers, gelatin, or pectin.

In addition to water soluble inks suitable for consumption, other water soluble inks exist. For instance certain water soluble inks which are appropriate for industrial direct ink printing applications are available. An example of direct ink printing can include single color printers such as those made by Markem-Imaje of Kennesaw, Ga. For this disclosure, water soluble also includes water dispersible.

These inks which are carried by the solid block would be consumed in the cleaning process. The small amount of ink material on the blocks poses no harm to the environment. For example, if a certain printing ink contained 50% of a "non environmentally preferred" solvent such ink would still be utilized in such a small amount to pose no harm to the environment. For a block of detergent that weighs approximately eight pounds (three thousand six hundred and thirty-two grams), if two grams of ink were applied, this would equate to 0.055% of the detergent. As the detergent is used at a customary rate of 1000 mg/L in the washing product, the concentration of the solvent in the washing process is approximately 0.275 mg/L or 275 parts per billion. This minute quantity also does not impact the intended washing process. Such construction meets the current U.S EPA-Design for the Environment program for consideration as environmentally friendly. By incorporating water soluble inks in direct association with the body of the solid block detergent, the block remains 100% soluble and consumable while eliminating the need for extraneous packaging to carry similar information which produces environmentally detrimental waste.

Multiple Detergents

Figure 12:
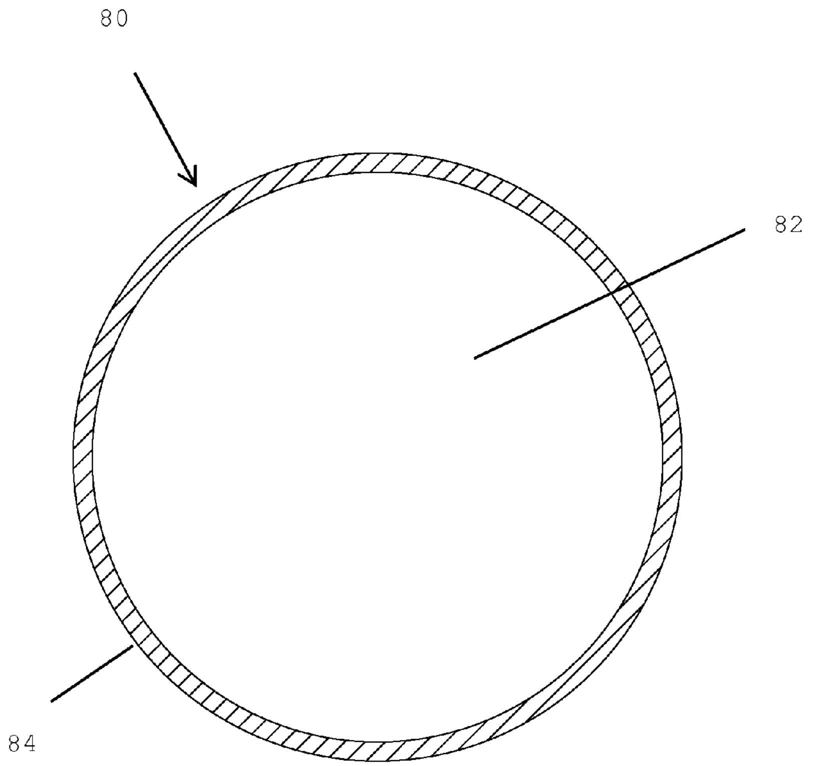
FIG. 12 is a cross sectional view of an alternative embodiment of the present invention incorporating multiple detergent components within a single block.

An alternative embodiment may be established utilizing the disclosed invention by incorporating different detergent compositions into a solid block. For instance, a first cleaning detergent composition could be manufactured by the disclosed process and once removed from the mold and sufficiently cured, the block could be coated with a second cleaning detergent composition such as a rinse aid and allowed to cure. A cross section of such a block is shown in FIG. 12. A first detergent component is identified as the interior component 82 of the block 80 and a second detergent component is identified as the exterior component 84 of the block 80. Such a block would enable a cleaning process to encompass the benefits of multiple components utilized in the cleaning process. Once the initial component has initially cured, the addition of the second component is done in such a manner that no cross-linking or contamination of one component "bleeds" into the other component such that each component contributes to a definitive cross-sectional portion of the block. This is accomplished utilizing components which are inert with one another when cured. Other manners of creating a multiple detergent block may be achieved by inserting a barrier into the mold and pouring the "outer" component into the mold and allowing to cure, and pouring the "inner" component and allowing to cure. When both components are suitably cured, the barrier may be removed.

As shown in FIG. 12, it is preferable that the primary detergent component, i.e. one that comprises more than 50% and preferably more than 90% of the detergent block is the innermost component with the secondary detergent component completely encapsulating the innermost component. In this manner, both detergents are simultaneously exposed to the water associated with the dispensing system so both detergents may be simultaneously dissolved and utilized during an industrial washing cycle.

Outer Coating

Alternatively, an outer coating may be applied to the detergent block as a means to identify the type of detergent it is, i.e. a rinse aid, detergent, etc. . . . . This coating may be polyethylene glycol. This coating layer could be colored to allow for color coded product identification. The coating layer could be colored to also allow for an attractive surface to decorate upon in order to enhance the marketability of the product. The soluble coating will be dissolved in the dispenser.

Thus it may be seen that a more advantageous method of producing a consumable soluble detergent may be had according to the present invention. The product is molded in a manner which enables the resulting product to be devoid of extraneous waste. This elimination of a waste product is critical to the invention. The product is preferably molded having a handle for ease of handling. The presence of a handle enables the product to have a sufficient quantity of consumable matter for effective utilization in an industrialized setting while also being maneuverable by a respective attendant. Furthermore, the product may experience direct labeling in a manner which is also consumable by the respective cleaning washing process further limiting the need for extraneous waste product.

The invention claimed is:

1. A method of manufacturing a detergent composition comprising:

combining a plurality of components suitable for producing a detergent block which is water soluble into a fluid mixture, said components of sufficient quantity to produce a soluble consumable detergent block weighing at least three pounds;

providing a mold assembly having a first mold component and a second mold component, said first and second mold components defining said mold assembly having a body, a top and a bottom, said body including an outer wall, a bottom and outer wall defining a mold interior, said outer wall defining an opening communicating with said mold interior;

said mold assembly having a general height extending from said bottom to said top of said mold assembly and wherein said mold assembly includes an indenture above a half way point of said mold extending into said interior, said indenture having an upper and lower portion offset from one another defining an indenture interior, said indenture forming a handle in said molded product for grasping by a person;

presenting said fluid mixture into said mold assembly;

enabling said fluid mixture to harden into at least a partially solid state within said mold defining a solid soluble, consumable detergent block having a handle formed by the indents of said first and second mold components; and separating said first and second mold components exposing said solid soluble, consumable detergent block having a handle to the ambient environment.

2. The method of claim 1 wherein said first mold component has an outer wall indented into an interior of the first mold member near said bottom to form an indent, said indent comprised of an upper section and a lower section which are integral with an intermediary transitional section, said indent forming a "S" configuration from an apex of the upper section to the lower extension of said lower section, said indented portion forming a recess within the respective molded solid sufficient for receiving the fingers of a person thereby forming a handle for grasping of the fingers of one hand; and said second mold component has an outer wall indented into an interior of the second mold member near said bottom to form an indent, said indent comprised of an upper section and a lower section which are integral with an intermediary transitional section, said indent forming a "S" configuration from the apex of the upper section to the lower extension of said lower section, said indented portion forming a recess within the respective molded solid sufficient for receiving the fingers of a person thereby forming a handle for grasping of the fingers of one hand.

* * * * *